United States Patent
Wegener et al.

(10) Patent No.: US 10,978,733 B2
(45) Date of Patent: Apr. 13, 2021

(54) CARBON-COATED SILICON PARTICLES FOR LITHIUM ION BATTERIES

(71) Applicant: WACKER CHEMIE AG, Munich (DE)

(72) Inventors: Jennifer Wegener, Munich (DE); Stefan Haufe, Neubiberg (DE); Jürgen Stohrer, Pullach (DE)

(73) Assignee: WACKER CHEMIE AG, Munich (DE)

( * ) Notice: Subject to any disclaimer, the term of this patent is extended or adjusted under 35 U.S.C. 154(b) by 51 days.

(21) Appl. No.: 16/347,808

(22) PCT Filed: Oct. 11, 2017

(86) PCT No.: PCT/EP2017/075947
§ 371 (c)(1),
(2) Date: May 6, 2019

(87) PCT Pub. No.: WO2018/082880
PCT Pub. Date: May 11, 2018

(65) Prior Publication Data
US 2019/0305366 A1    Oct. 3, 2019

(30) Foreign Application Priority Data
Nov. 7, 2016  (DE) ............. 10 2016 221 782.8

(51) Int. Cl.
*H01M 4/00*   (2006.01)
*H01M 10/0525*   (2010.01)
(Continued)

(52) U.S. Cl.
CPC ..... *H01M 10/0525* (2013.01); *H01M 4/0428* (2013.01); *H01M 4/134* (2013.01);
(Continued)

(58) Field of Classification Search
CPC ........... H01M 2004/028; H01M 4/621; H01M 2004/027; H01M 4/0428; H01M 4/366; H01M 4/625; H01M 4/1395; H01M 4/362
See application file for complete search history.

(56) References Cited

U.S. PATENT DOCUMENTS 8,394,532 B2    3/2013  Kang et al.
2007/0122712 A1  5/2007  Kang et al.
(Continued)

FOREIGN PATENT DOCUMENTS

DE    102015215415 A1    2/2017
EP    1024544 A2    8/2000
(Continued)

OTHER PUBLICATIONS

English abstract for JP 2002151066 A.
(Continued)

*Primary Examiner* — Cynthia H Kelly
*Assistant Examiner* — Monique M Wills
(74) *Attorney, Agent, or Firm* — Brooks Kushman P.C.

(57) ABSTRACT

The invention relates to non-aggregated carbon-coated silicon particles having average particle diameters $d_{50}$ of 1 to 15 μm, which particles contain ≤10 wt % carbon and ≥90 wt % silicon, each based on the total weight of the carbon-coated silicon particles

14 Claims, 5 Drawing Sheets

(51) Int. Cl.
  *H01M 4/04*  (2006.01)
  *H01M 4/36*  (2006.01)
  *H01M 4/38*  (2006.01)
  *H01M 4/62*  (2006.01)
  *H01M 4/1395* (2010.01)
  *H01M 4/134*  (2010.01)
  *H01M 4/02*  (2006.01)

(52) U.S. Cl.
  CPC ......... *H01M 4/1395* (2013.01); *H01M 4/362* (2013.01); *H01M 4/366* (2013.01); *H01M 4/386* (2013.01); *H01M 4/621* (2013.01); *H01M 4/625* (2013.01); *H01M 2004/027* (2013.01); *H01M 2004/028* (2013.01)

(56) References Cited

U.S. PATENT DOCUMENTS

| | | |
|---|---|---|
| 2009/0208844 A1 | 8/2009 | Kepler et al. |
| 2012/0100438 A1 | 4/2012 | Fasching et al. |
| 2013/0071750 A1 | 3/2013 | Park et al. |
| 2015/0270536 A1 | 9/2015 | Haufe |
| 2016/0104882 A1 | 4/2016 | Yushin et al. |
| 2016/0141600 A1 | 5/2016 | Furuya et al. |
| 2018/0083272 A1* | 3/2018 | Son ....................... H01M 4/364 |
| 2018/0212234 A1 | 7/2018 | Haufe |

FOREIGN PATENT DOCUMENTS

| | | |
|---|---|---|
| EP | 1054462 A1 | 11/2000 |
| EP | 2919298 B1 | 8/2017 |
| JP | 2002151066 A | 5/2002 |
| JP | 2002352797 A | 12/2002 |
| JP | 2002353797 A2 | 12/2002 |
| JP | 2004259475 A | 9/2004 |
| JP | 2013008654 A2 | 1/2013 |
| JP | 2016048628 A2 | 4/2016 |
| JP | 2016100047 A2 | 5/2016 |
| KR | 20130031778 A | 3/2013 |

OTHER PUBLICATIONS

English abstract for JP 2004259475 A.
Liu, Journal of the Electrochemical Society, 2005, 152, (9), pp. A1719-A1725.
Yoshio et al, Journal of the Electrochemical Society, 2002, 149 (12), pp. A1598-A1603.
Umeno et al., Chemistry Letters, 2001, pp. 1186-1187.
Liu et al, Electrochemical and Solid-State Letters, 8 (2), 2005, pp. A100-A103.
KR 20130031778 A, US 2013/0071750 A1.
JP 2002-352797 A, English abstract.

* cited by examiner

CARBON-COATED SILICON PARTICLES FOR LITHIUM ION BATTERIES

CROSS-REFERENCE TO RELATED APPLICATIONS

This application is a U.S. National Phase Application of PCT/EP2017/075947, filed Oct. 11, 2017, which claims priority to German Application No. 10 2016 221 782.8 filed on Nov. 7, 2016 the contents of which are incorporated herein by reference in their entirety for all purposes.

FIELD OF THE INVENTION

The invention relates to carbon-coated, microscale silicon particles, to processes for production thereof and to the use thereof for production of electrode materials for lithium ion batteries, especially for production of the negative electrodes of lithium ion batteries.

BACKGROUND OF THE INVENTION

Of the electrochemical energy storage means commercially available, rechargeable lithium ion batteries currently have the highest specific energy of up to 250 Wh/kg. They are utilized in particular in the field of portable electronics, for tools and also for means of transport, for example two-wheeled vehicles or automobiles. Especially for use in automobiles, however, it is necessary to further distinctly increase the energy density of the batteries in order to achieve higher ranges of the vehicles.

The negative electrode material ("anode") used in practice is currently graphitic carbon in particular. Graphitic carbon is notable for its stable cycling properties and its comparatively high handling safety compared to lithium metal which is used in lithium primary cells. For instance, graphitic carbon, in the intercalation and deintercalation of lithium, undergoes only small changes in volume, for example in the region of 10% for the limiting stoichiometry of $LiC_6$. A disadvantage, however, is its relatively low electrochemical capacity of theoretically 372 mAh/g, which corresponds only to about one tenth of the electrochemical capacity theoretically achievable with lithium metal.

By contrast, silicon at 4199 mAh/g has the highest known storage capacity for lithium ions. Disadvantageously, silicon-containing active electrode materials, on charging and discharging with lithium, suffer extreme changes in volume of up to about 300%. As a result of this change in volume, there is significant mechanical stress on the active material and the overall electrode structure, which leads, as a result of electrochemical grinding, to a loss of electrical contact connection and hence to destruction of the electrode with loss of capacity. Moreover, the surface of the silicon anode material used reacts with constituents of the electrolyte to continuously form passivating protective layers (solid electrolyte interphase; SEI), which leads to an irreversible loss of mobile lithium.

In order to counter such problems, a number of documents have recommended carbon-coated silicon particles as active material for anodes of lithium ion batteries. For instance, Liu, Journal of The Electrochemical Society, 2005, 152 (9), pages A1719 to A1725 describes carbon-coated silicon particles having a high carbon content of 27% by weight. Silicon particles coated with 20% by weight of carbon are described by Ogumi in the Journal of The Electrochemical Society, 2002, 149 (12), pages A1598 to A1603. JP2002151066 specifies a carbon content of 11% to 70% by weight for carbon-coated silicon particles. The coated particles of Yoshio, Chemistry Letters, 2001, pages 1186 to 1187, contain 20% by weight of carbon and an average particle size of 18 µm. The layer thickness of the carbon coating is 1.25 µm. The publication by N.L. Wu, Electrochemical and Solid-State Letters, 8 (2). 2005. pages A100 to A103, discloses carbon-coated silicon particles having a carbon content of 27% by weight.

JP2004-259475 teaches processes for coating silicon particles with non-graphite carbon material and optionally graphite, and subsequent carbonizing, wherein the process cycle of coating and carbonizing is repeated several times. Moreover, JP2004-259475 specifies using the non-graphite carbon material and any graphite in the form of a suspension for the surface coating. As is known, such process measures lead to aggregated carbon-coated silicon particles. In U.S. Pat. No. 8,394,532 as well, carbon-coated silicon particles were produced from a dispersion. 20% by weight of carbon fibers is specified for the starting material, based on silicon.

EP1024544 is concerned with silicon particles, the surface of which is fully covered with a carbon layer. All that are specifically disclosed, however, are aggregated carbon-coated silicon particles, as illustrated by the examples with reference to the average particle diameters of silicon and the products. EP2919298 teaches processes for preparing composites by pyrolyzing mixtures containing silicon particles and predominantly polymers, and subsequent grinding, which implies aggregated particles. US2016/0104882 has composite materials for its subject matter, in which a multitude of silicon particles have been embedded into a carbon matrix. Thus, the individual carbon-coated silicon particles are in the form of aggregates.

US2009/0208844 describes silicon particles with a carbon coating comprising electrically conductive, elastic carbon material, specifically expanded graphite. What are thus disclosed are silicon particles wherein expanded graphite particles are attached in particulate form to the surface by means of a carbon coating. No process-related pointers can be inferred from US2009/0208844 for production of non-aggregated carbon-coated silicon particles. US2012/0100438 includes porous silicon particles with carbon coating, but without specific details relating to the production of the coating and the carbon and silicon contents of the particles.

EP1054462 teaches, for production of anodes, coating current collectors with silicon particles and binders and then carbonizing them.

Against this background, the problem that still existed was to modify silicon particles as active material for anodes of lithium ion batteries such that the corresponding lithium ion batteries have high initial reversible capacities and additionally, in the subsequent cycles, have stable electrochemical behavior with a minimum decline in reversible capacity (fading).

BRIEF SUMMARY OF THE INVENTION

The invention provides nonaggregated carbon-coated silicon particles having average particle diameters $d_{50}$ of 1 to 15 µm, containing ≤10% by weight of carbon and ≥90% by weight of silicon, based in each case on the total weight of the carbon-coated silicon particles.

The invention further provides processes for producing the aforementioned carbon-coated silicon particles of the invention by
a) dry methods in which mixtures comprising silicon particles and one or more meltable carbon precursors are heated to a temperature of <400° C. until the meltable carbon precursors have completely melted (melting stage), and then the molten carbon precursors thus obtained are carbonized; or b) CVD methods (chemical vapor deposition, chemical gas phase deposition) in which silicon particles are coated with carbon using one or more carbon precursors, where the particles are agitated during the performance of the CVD method and the CVD method is conducted in an atmosphere containing carbon precursors to an extent of 0.1% to 80% by volume, based on the total volume of the atmosphere.

The invention further provides nonaggregated carbon-coated silicon particles having average particle diameters $d_{50}$ of 1 to 15 µm, containing ≤10% by weight of carbon and ≥90% by weight of silicon, based in each case on the total weight of the carbon-coated silicon particles, obtainable by the aforementioned methods.

The nonaggregated carbon-coated silicon particles of the invention are also referred to hereinafter in abbreviated form as carbon-coated silicon particles.

In order to be able to obtain carbon-coated silicon particles of the invention, it was found to be essential to the invention to follow the provisions of the invention for the drying method or for the CVD method. Otherwise, aggregates of carbon-coated silicon particles, for example, are formed.

Surprisingly, carbon-coated silicon particles that are not aggregated are obtainable in accordance with the invention. Sticking or sintering and hence aggregation of different particles surprisingly occurred at least only to an insignificant degree, if at all. This was all the more surprising since, during the carbonization of the meltable carbon precursors, liquid or pasty carbon-containing species were present as usual, which can function as adhesive and can lead to caking of the particles after cooling. Surprisingly, nonaggregated carbon-coated silicon particles were nevertheless obtained in accordance with the invention.

BREIF DESCRIPTION OF THE DRAWINGS

DETAILED DESCRIPTION OF PREFERRED EMBODIMENTS

Figure 1:
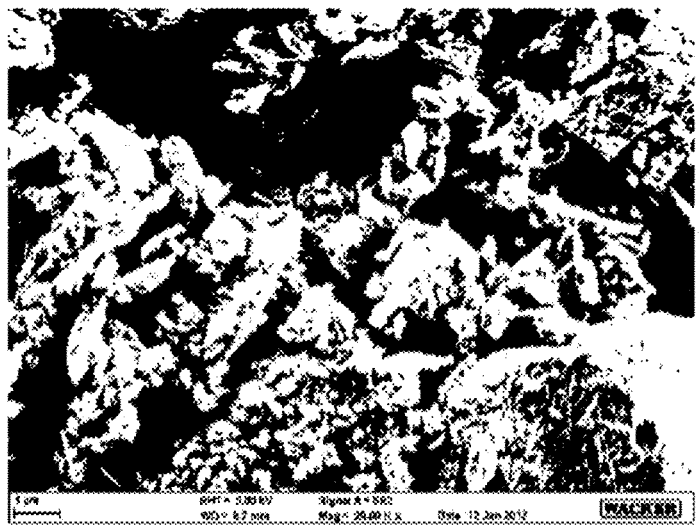
FIG. 1 is an SEM image (7,500-fold magnification) of dry Si dust illustrating individual nonaggregated splintery particles.

The carbon-coated silicon particles are preferably in the form of isolated particles or loose agglomerates, but not in the form of aggregates of carbon-coated silicon particles. Agglomerates are clusters of multiple carbon-coated silicon particles. Aggregates are clusters of carbon-coated silicon particles. Agglomerates can be separated into the individual carbon-coated silicon particles, for example by kneading or dispersing methods. Aggregates cannot be separated into the individual particles in this way without destroying carbon-coated silicon particles. However, in individual cases, this does not rule out formation of aggregated carbon-coated silicon particles to a small degree in the process of the invention.

The presence of carbon-coated silicon particles in the form of aggregates can be visualized, for example, by means of scanning electron microscopy (SEM) or transmission electron microscopy (TEM). Particularly suitable for this purpose is a comparison of SEM images or TEM images of the uncoated silicon particles with corresponding images of the carbon-coated silicon particles. Static light scattering methods for determination of the particle size distributions or particle diameters on their own are not suitable for ascertaining the presence of aggregates. If, however, the carbon-coated silicon particles have significantly greater particle diameters within the scope of measurement accuracy than the silicon particles used for production thereof, this is a pointer to the presence of aggregated carbon-coated silicon particles. Particular preference is given to using the aforementioned determination methods in combination.

The carbon-coated silicon particles have a degree of aggregation of preferably ≤40%, more preferably ≤30% and most preferably ≤20%. The degree of aggregation is determined by a sieve analysis. The degree of aggregation corresponds to the percentage of the particles which, after dispersion in ethanol with simultaneous ultrasound treatment, do not pass through a sieve having a mesh size of twice the $d_{90}$ value of the volume-weighted particle size distribution of the respective particle composition to be examined.

The difference between the volume-weighted particle size distributions $d_{50}$ of the carbon-coated silicon particles and of the silicon particles used as reactant is also an indicator that the carbon-coated silicon particles are nonaggregated. The difference between the volume-weighted particle size distribution $d_{50}$ of the carbon-coated silicon particles and the volume-weighted particle size distribution $d_{50}$ of the silicon particles used as reactant for production of the carbon-coated silicon particles is preferably ≤5 µm, more preferably ≤3 µm and most preferably ≤2 µm.

The carbon-coated silicon particles have volume-weighted particle size distributions having diameter percentiles $d_{50}$ of preferably ≥2 µm, more preferably ≥3 µm and most preferably ≥4 µm. The carbon-coated silicon particles have $d_{50}$ values of preferably ≤10 µm, more preferably ≤8 µm and most preferably ≤6 µm.

The carbon-coated silicon particles have volume-weighted particle size distributions having $d_{90}$ values of preferably ≤40 µm, more preferably $d_{90}$≤30 µm and even more preferably $d_{90}$≤10 µm.

The carbon-coated silicon particles have volume-weighted particle size distributions having $d_{10}$ values of preferably ≥0.5 µm, more preferably $d_{10}$≥1 µm and most preferably $d_{10}$≥1.5 µm.

The particle size distribution of the carbon-coated silicon particles may be bimodal or polymodal and is preferably monomodal, more preferably narrow. The volume-weighted particle size distribution of the carbon-coated silicon particles has a width $(d_{90}-d_{10})/d_{50}$, of preferably ≤3, more preferably ≤2.5, especially preferably ≤2 and most preferably ≤1.5.

The volume-weighted particle size distribution of the carbon-coated silicon particles was determined by static laser scattering using the Mie model with the Horiba LA 950 measuring instrument with ethanol as dispersion medium for the carbon-coated silicon particles.

The carbon coating of the carbon-coated silicon particles has an average layer thickness in the range from preferably 1 to 100 nm, more preferably 1 to 50 nm (determination method: scanning electron microscopy (SEM) and/or transmission electron microscopy (TEM)).

The carbon-coated silicon particles typically have BET surface areas of preferably 0.1 to 10 $m^2/g$, more preferably 0.3 to 8 $m^2/g$ and most preferably 0.5 to 5 $m^2/g$ (determination to DIN ISO 9277:2003-05 with nitrogen).

The carbon coating may be porous and is preferably nonporous. The carbon coating has a porosity of preferably ≤2% and more preferably ≤1% (determination method for total porosity: 1 minus [quotient of apparent density (determined by means of xylene pycnometry to DIN 51901) and skeletal density (determined by means of He pycnometry to DIN 66137-2)]).

The carbon coating of the carbon-coated silicon particles is preferably impermeable to liquid media, such as aqueous or organic solvents or solutions, especially aqueous or organic electrolytes, acids or alkalis.

In general, the silicon particles are not within pores. The carbon coating is generally directly on the surface of the silicon particles.

The carbon coating is generally in the form of a film or is generally not particulate or fibrous. In general, the carbon coating does not contain any particles or any fibers, such as carbon fibers or graphic particles.

In the carbon-coated silicon particles, the silicon particles are partly or preferably fully embedded in carbon. The surface of the carbon-coated silicon particles consists partly or preferably entirely of carbon.

The carbon may be present in the carbon coating in amorphous form or preferably partly or completely in crystalline form.

In general, each carbon-coated silicon particle contains a silicon particle (determination method: scanning electron microscopy (SEM) and/or transmission electron microscopy (TEM)).

The carbon-coated silicon particles may assume any desired shapes and are preferably splintery.

The carbon-coated silicon particles preferably contains 0.1% to 8% by weight, more preferably 1% to 7% by weight, even more preferably 1% to 5% by weight and especially preferably 1% to 4% by weight of carbon. The carbon-coated silicon particles contain preferably 92% to 99.9% by weight, more preferably 93% to 99% by weight, even more preferably 95% to 99% by weight and especially preferably 96% to 99% by weight of silicon particles. The above figures in % by weight are based in each case on the total weight of the carbon-coated silicon particles.

The carbon coating may have oxygen contents, for example, of ≤20% by weight, preferably ≤10% by weight and more preferably ≤5% by weight. Nitrogen may be present in the carbon coating, for example, to an extent of 0% to 10% by weight and preferably between 2% and 5% by weight. Nitrogen is preferably present here chemically bound in the form of heterocycles, for example as pyridine or pyrrole units (N). As well as the main constituents mentioned, it is also possible for further chemical elements to be present, for example in the form of a controlled addition or coincidental impurity: such as Li, Fe, Al, Cu, Ca, K, Na, S, Cl, Zr, Ti, Pt, Ni, Cr, Sn, Mg, Ag, Co, Zn, B, P, Sb, Pb, Ge, Bi, rare earths; the contents thereof are preferably 1% by weight and more preferably ≤100 ppm. The above figures in % by weight are based in each case on the total weight of the carbon coating.

In addition, the carbon-coated silicon particles may contain one or more conductive additives, for example graphite, conductive black, graphene, graphene oxide, graphene nanoplatelets, carbon nanotubes or metallic particles such as copper. Preferably no conductive additives are present.

The silicon particles have volume-weighted particle size distributions having diameter percentiles $d_{50}$ of preferably 1 to less than 15 µm, more preferably 2 to less than 10 µm and most preferably 3 to less than 8 µm (determination: with the Horiba LA 950 measuring instrument as described above for the carbon-coated silicon particles).

The silicon particles are preferably nonaggregated and more preferably nonagglomerated. "Aggregated" means that spherical or very substantially spherical primary particles as formed at first, for example, in gas phase processes in the course of production of the silicon particles combine later on in the reaction in the gas phase process to form aggregates. Aggregates or primary particles can also form agglomerates. Agglomerates are a loose cluster of aggregates or primary particles. Agglomerates can easily be split up again into the aggregates by kneading and dispersion methods that are typically used. Aggregates can be divided only partly into the primary particles, if at all, by these methods. Owing to their formation, aggregates and agglomerates inevitably have entirely different grain shapes than the preferred silicon particles.

For determination of aggregation, the statements made in this regard in relation to the carbon-coated silicon particles are analogously applicable to the silicon particles.

The silicon particles preferably have splintery grain shapes.

Silicon particles may consist of elemental silicon, a silicon oxide or a binary, ternary or multinary silicon/metal alloy (with, for example, Li, Na, K, Sn, Ca, Co, Ni, Cu, Cr, Ti, Al, Fe). Preference is given to using elemental silicon, especially since it has an advantageously high storage capacity for lithium ions.

Elemental silicon is generally understood to mean high-purity polysilicon with a small proportion of foreign atoms (for example B, P, As), silicon with controlled foreign atom doping (for example B, P, As), but also silicon from metallurgical processing which may include elemental impurity (for example Fe, Al, Ca, Cu, Zr, C).

If the silicon particles contain a silicon oxide, the stoichiometry of the oxide $SiO_x$ is preferably in the range of 0<x<1.3. If the silicon particles contain a silicon oxide having higher stoichiometry, the layer thickness thereof on the surface is preferably less than 10 nm.

When the silicon particles have been alloyed with an alkali metal M, the stoichiometry of the alloy $M_ySi$ is preferably in the range of 0<y<5. The silicon particles may optionally have been prelithiated. If the silicon particles have been alloyed with lithium, the stoichiometry of the alloy $Li_zSi$ is preferably in the range of 0<z<2.2.

Particular preference is given to silicon particles containing ≥80 mol % of silicon and/or ≤20 mol % of foreign atoms, even more preferably ≤10 mol % of foreign atoms.

In a preferred embodiment, the silicon particles consist to an extent of preferably ≥96% by weight, more preferably ≥98% by weight, of silicon, based on the total weight of the silicon particles. The silicon particles preferably contain essentially no carbon.

The surface of the silicon particles may optionally be covered by an oxide layer or by other inorganic and organic groups. Particularly preferred silicon particles bear, on the surface, Si—OH— or Si—H— groups or covalently attached organic groups, for example alcohols or alkenes.

The silicon particles may be produced, for example, by grinding processes, for example wet or preferably dry grinding processes. Preference is given here to using jet mills, for example counter-jet mills, or impact mills, planetary ball mills or stirred ball mills. Wet grinding is generally effected in a suspension with organic or inorganic dispersion media. In this context, the established processes may be employed, as described, for example, in the patent application with application number DE 102015215415.7.

In the dry method of the invention for production of the carbon-coated silicon particles, mixtures comprising silicon particles and one or more meltable carbon precursors are produced.

The mixtures contain the silicon particles to an extent of preferably 20% to 99% by weight, more preferably 30% to 98% by weight, even more preferably 50% to 97% by weight, especially preferably 70% to 96% by weight and most preferably 80% to 95% by weight, based on the total weight of the mixtures.

Preferred meltable carbon precursors are polymers. Preferred polymers are polyacrylonitrile; carbohydrates, such as mono-, di- and polysaccharides; polyvinylaromatics or polyaromatics, such as polyaniline, polystyrene; polyaromatic hydrocarbons, such as pitches or tars, especially mesogenous pitch, mesophase pitch, petroleum pitch, hard coal pitch. Particularly preferred polymers are polyaromatic hydrocarbons, pitches and polyacrylonitrile.

The mixtures contain the meltable carbon precursors to an extent of preferably 1% to 80% by weight, more preferably 2% to 70% by weight, even more preferably 3% to 50% by weight, especially preferably 4% to 30% by weight and most preferably 5% to 20% by weight, based on the total weight of the mixtures.

In addition, the mixtures for the dry method may contain one or more conductive additives, for example graphite, conductive black, graphene, graphene oxide, graphene nanoplatelets, carbon nanotubes or metallic particles, such as copper. Preferably no conductive additives are present.

In the dry method, generally no solvent is used. In general, it is conducted in the absence of solvent. However, this does not mean that the reactants used, for example as a result of their preparation, cannot contain any residual contents of solvent. Preferably, the mixtures for the dry method, especially the silicon particles and/or the meltable carbon precursors, contain ≤2% by weight, more preferably ≤1% by weight and most preferably ≤0.5% by weight of solvent.

Examples of solvents are inorganic solvents, such as water, or organic solvents, especially hydrocarbons, ethers, esters, nitrogen-functional solvents, sulfur-functional solvents, alcohols, such as ethanol and propanol, benzene, toluene, dimethylformamide, N-methyl-2-pyrrolidone, N-ethyl-2-pyrrolidone and dimethyl sulfoxide.

The silicon particles and the meltable carbon precursors can be mixed in a conventional manner, for example at temperatures of 0 to 50° C., preferably 15 to 35° C. It is possible to use standard mixers, for example pneumatic mixers, freefall mixers, such as container mixers, cone mixers, drum roller mixers, gyro mixers, tumble mixers or displacement and impeller mixers such as drum mixers and screw mixers. Mixing can also be accomplished using mills commonly used for the purpose, such as planetary ball mills, stirred ball mills or drum mills.

The mixtures comprising silicon particles and one or more meltable carbon precursors are heated to a temperature of <400° C. until the meltable carbon precursors have melted completely (melting stage). The temperature in the melting stage for the respective meltable carbon precursor is guided by its melting point or melting temperature range. In general, during the melting stage, carbonization of the meltable carbon precursors takes place only to an insignificant degree, if at all. The proportion of the meltable carbon precursors that is carbonized during the melting stage is preferably ≤20% by weight, more preferably ≤10% by weight and most preferably ≤5% by weight, based on the total weight of the meltable carbon precursors used overall.

The meltable carbon precursors can be melted in conventional furnaces, for example in tubular furnaces, calcination furnaces, rotary kilns or a fluidized bed reactor.

The duration of the melting stage is guided, for example, by the melting point, by the temperature chosen in the individual case for the melting, and also by the furnace. The duration of the melting stage is, for example, 5 minutes to 2 hours, preferably 10 minutes to 70 minutes.

The heating rates during the melting stage are preferably 1 to 20° C. per minute, more preferably 1 to 15° C./min, especially preferably 1 to 10° C./min.

The meltable carbon precursors have melted completely when the meltable carbon precursors have been converted from the solid phase completely to their liquid phase, as is common knowledge.

The meltable carbon precursors are carbonized after the complete melting. On carbonization, the meltable carbon precursors are generally converted to inorganic carbon.

The carbonizing is preferably effected in the same apparatuses that are also used for the melting stage. The carbonization can be conducted in a static manner or with constant mixing of the reaction medium.

The carbonization is effected at temperatures of preferably more than 400 to 1400° C., more preferably 700 to 1200° C. and most preferably 900 to 1100° C.

The heating rates during the carbonization are preferably 1 to 20° C. per minute, more preferably 1 to 15° C./min, especially preferably 1 to 10° C./min and most preferably 3 to 5° C./min. In addition, a stepwise process with different intermediate temperatures and heating rates is also possible. After attainment of the target temperature, the reaction mixture is typically kept at the temperature for a certain time or subsequently cooled down straight away. Advantageous holding times are, for example, 30 min to 24 h, preferably 1 to 10 h and more preferably 2 to 4 h. The cooling can be conducted actively or passively, uniformly or in stages.

The mixing and the carbonizing can take place under aerobic or preferably anaerobic conditions. Particular preference is given to an inert gas atmosphere, such as a nitrogen or preferably argon atmosphere. The inert gas atmosphere may optionally additionally contain fractions of a reducing gas, such as hydrogen. The inert gas atmosphere may be static above the reaction medium or flow over the reaction mixture in the form of a gas flow.

In the CVD method of the invention for producing the carbon-coated silicon particles, silicon particles are coated with carbon using one or more carbon precursors.

Carbon precursors suitable for the CVD method are, for example, hydrocarbons, such as aliphatic hydrocarbons having 1 to 10 carbon atoms, especially 1 to 4 carbon atoms.

Examples of these are methane, ethane, propane, propylene, butane, butene, pentane, isobutane, hexane; unsaturated hydrocarbons having 1 to 4 carbon atoms, such as ethylene, acetylene or propylene; aromatic hydrocarbons, such as benzene, toluene, styrene, ethylbenzene, diphenylmethane or naphthalene; further aromatic hydrocarbons, such as phenol, cresol, nitrobenzene, chlorobenzene, pyridine, anthracene, phenanthrene.

Preferred carbon precursors for the CVD method are methane, ethane and especially ethylene, acetylene, benzene or toluene.

In the CVD method, the silicon particles are preferably heated in an atmosphere, especially a gas stream, containing one or more generally gaseous carbon precursors. Under the process conditions typical of the CVD method, the carbon precursors are in the gaseous state as usual. As usual, the carbon precursors break down at the hot surface of the silicon particles with deposition of carbon.

The CVD method is conducted in an atmosphere containing carbon precursors to an extent of preferably 0.1% to 80% by volume, more preferably 0.5% to 50% by volume, even more preferably 1% to 30% by volume, most preferably 2% to 25% by volume and at the very most preferably 5% to 20% by volume, based on the total volume of the atmosphere.

The further constituents, especially the remaining constituents, of the atmosphere are preferably inert gases, such as nitrogen or preferably argon, and optionally reducing gases, such as hydrogen.

The atmosphere preferably contains 10% to 99% by volume, more preferably 20% to 90% by volume, especially preferably 25% to 80% by volume and most preferably 50% to 75% by volume of inert gases, based on the total volume of the atmosphere.

The atmosphere contains preferably 0.01% to 80% by volume, more preferably 3% to 60% by volume and especially preferably 5% to 40% by volume of hydrogen, based on the total volume of the atmosphere.

During the performance of the CVD method, the particles, especially the silicon particles and the carbon-coated silicon particles formed, are agitated, preferably fluidized.

The agitation or fluidization of the particles can be effected, for example, via mechanical, acoustic and/or pneumatic energy input, for example with stirring, vibration or exposure to ultrasound. The fluidizing of the particles can be assisted by a gas stream, especially a gas stream comprising carbon precursors and optionally further constituents of the atmosphere of the CVD method. The velocity of the gas stream chosen in the case of fluidization is preferably at least sufficiently great that the silicon particles can be converted to the fluidized state. In the fluidized state, particles are known to have fluid-like properties.

As is well known, particles may be classified into Geldart classes A to D in accordance with their fluidization characteristics. The particles in the CVD method of the invention preferably belong to Geldart class C. Particles assigned to Geldart class C are generally extremely small and hence cohesive particles having particle diameters below 30 µm, especially below 20 µm. In order to obtain nonaggregated carbon-coated silicon particles, owing to the strong cohesion forces, the CVD method of the invention has to be conducted in the agitated, preferably fluidized, state. The agitating and fluidizing themselves can be achieved in a conventional manner as specified further up.

The temperatures in the CVD method are preferably 600 to 1400° C., more preferably 700 to 1200° C. and most preferably 800 to 1100° C.

The CVD method is preferably conducted at a pressure of 0.5 to 2 bar.

The duration of the treatment of the silicon particles in the CVD method is preferably 1 to 240 minutes, more preferably 5 to 120 minutes and most preferably 10 to 60 minutes.

The total amount of gas, especially the total amount of carbon precursors, during the coating is generally chosen such that the desired carbon deposition is achieved.

Otherwise, the CVD method can be executed in a conventional manner.

Preferably, the silicon particles are coated with carbon solely by a single coating operation by the dry method or by the CVD method. Carbon-coated silicon particles are preferably not subjected to a further carbon coating by the dry method or by the CVD method or by any other method.

The carbon-coated silicon particles obtained by the dry method or by the CVD method may be sent directly to further utilization thereof, for example for production of electrode materials, or alternatively be freed of over- or undersize by classification techniques (sieving, sifting). There are preferably no mechanical aftertreatments or classification, especially no grinding.

The carbon-coated silicon particles are suitable, for example, as silicon-based active materials for anode active materials for lithium ion batteries.

The invention further provides anode materials for lithium ion batteries comprising one or more binders, optionally graphite, optionally one or more further electrically conductive components and optionally one or more additives, characterized in that one or more carbon-coated silicon particles of the invention are present.

Preferred recipes for the anode material of the lithium ion batteries contain preferably 5% to 95% by weight, especially 60% to 85% by weight, of carbon-coated silicon particles of the invention; 0% to 40% by weight, especially 0% to 20% by weight, of further electrically conductive components; 0% to 80% by weight, especially 5% to 30% by weight, of graphite; 0% to 25% by weight, especially 5% to 15% by weight, of binder; and optionally 0% to 80% by weight, especially 0.1% to 5% by weight, of additives; where the figures in % by weight are based on the total weight of the anode material and the proportions of all constituents of the anode material add up to 100% by weight.

In a preferred recipe for the anode material, the proportion of graphite particles and further electrically conductive components totals at least 10% by weight, based on the total weight of the anode material.

The invention further provides lithium ion batteries comprising a cathode, an anode, a separator and an electrolyte, characterized in that the anode is based on the aforementioned anode material of the invention.

As well as the carbon-coated silicon particles of the invention, the anode materials and lithium ion batteries of the invention can be produced using the starting materials in common use for the purpose, and the processes in common use for the purpose may find use for producing the anode materials and lithium ion batteries, as described, for example, in patent application with application number DE 102015215415.7.

The invention further provides lithium ion batteries comprising a cathode, an anode, a separator and an electrolyte, characterized in that
the anode is based on the aforementioned anode material of the invention;
and the anode material of the fully charged lithium ion battery is only partly lithiated.

The present invention further provides methods of operating lithium ion batteries comprising a cathode, an anode, a separator and an electrolyte, characterized in that the anode is based on the aforementioned anode material of the invention; and the anode material is only partly lithiated on complete charging of the lithium ion battery.

The invention further provides for the use of the anode materials of the invention in lithium ion batteries that are configured such that the anode materials are only partly lithiated in the fully charged state of the lithium ion batteries.

It is thus preferable that the anode material, especially the carbon-coated silicon particles of the invention, is only partly lithiated in the fully charged lithium ion battery. "Fully charged" refers to the state of the battery in which the anode material of the battery has its highest charge of lithium. Partial lithiation of the anode material means that the maximum lithium absorption capacity of the silicon particles in the anode material is not exhausted. The maximum lithium absorption capacity of the silicon particles corresponds generally to the formula $Li_{4.4}Si$ and is thus 4.4 lithium atoms per silicon atom. This corresponds to a maximum specific capacity of 4200 mAh per gram of silicon.

The ratio of the lithium atoms to the silicon atoms in the anode of a lithium ion battery (Li/Si ratio) can be adjusted, for example, via the flow of electrical charge. The degree of lithiation of the anode material or of the silicon particles present in the anode material is proportional to the electrical charge that has flowed. In this variant, in the course of charging of the lithium ion battery, the capacity of the anode material for lithium is not fully exhausted. This results in partial lithiation of the anode.

In an alternative, preferred variant, the Li/Si ratio of a lithium ion battery is adjusted by the cell balancing. In this case, the lithium ion batteries are designed such that the lithium absorption capacity of the anode is preferably greater than the lithium release capacity of the cathode. The effect of this is that, in the fully charged battery, the lithium absorption capacity of the anode is not fully exhausted, meaning that the anode material is only partly lithiated.

In the case of the partial lithiation of the invention, the Li/Si ratio in the anode material in the fully charged state of the lithium ion battery is preferably ≤2.2, more preferably ≤1.98 and most preferably ≤1.76. The Li/Si ratio in the anode material in the fully charged state of the lithium ion battery is preferably ≥0.22, more preferably ≥0.44 and most preferably ≥0.66.

The capacity of the silicon in the anode material of the lithium ion battery is preferably utilized to an extent of ≤50%, more preferably to an extent of ≤45% and most preferably to an extent of ≤40%, based on a capacity of 4200 mAh per gram of silicon.

The degree of lithiation of silicon or the exploitation of the capacity of silicon for lithium (Si capacity utilization a) can be determined, for example, as described in the patent application with application number DE 102015215415.7 at page 11 line 4 to page 12 line 25, especially using the formula given therein for the Si capacity utilization a and the supplementary information under the headings "Bestimmung der Delithiierungs-Kapazität β" [Determination of the delithiation capacity β] and "Bestimmung des Si-Gewichtsanteils $\omega_{Si}$" [Determination of the proportion by weight of Si $\omega_{Si}$]("incorporated by reference").

The use of the carbon-coated silicon particles of the invention in lithium ion batteries surprisingly leads to an improvement in the cycling characteristics thereof. Such lithium ion batteries have a small irreversible loss of capacity in the first charging cycle and stable electrochemical characteristics with only slight fading in the subsequent cycles. The carbon-coated silicon particles of the invention can thus achieve a small initial loss of capacity and additionally a small continuous loss of capacity of the lithium ion batteries. Overall, the lithium ion batteries of the invention have very good stability. This means that, even in the case of a multitude of cycles, barely any fatigue phenomena occur, for example as a result of mechanical destruction of the anode material of the invention or SEI.

Surprisingly, the carbon-coated silicon particles of the invention can be used to obtain lithium ion batteries which, as well as the aforementioned advantageous cycling characteristics, simultaneously also have a high volumetric energy density.

Carbon-coated silicon particles of the invention, even without densification or with minor densification, can be used to achieve anodes having high volumetric capacities. Anodes having conventional aggregated carbon-coated silicon particles need densification in order to achieve the desired volumetric capacities, but this is associated with a drop in electrochemical performance (cycling stability).

Furthermore, the carbon-coated silicon particles of the invention advantageously have high electrical conductivity and high stability to corrosive media, for example organic solvents, acids or alkalis. The internal cell resistance of lithium ion batteries can also be reduced with carbon-coated silicon particles of the invention.

Moreover, the carbon-coated silicon particles of the invention are surprisingly stable in water, especially in aqueous ink formulations for anodes of lithium ion batteries, and so it is possible to reduce the evolution of hydrogen that occurs with conventional silicon particles under such conditions. This enables processing without foaming of the aqueous ink formulation and the production of particularly homogeneous or gas bubble-free anodes. The silicon particles used as reactant in the process of the invention, by contrast, generate large amounts of hydrogen in water.

Aggregated carbon-coated silicon particles as obtained, for example, in the coating of silicon particles with carbon using solvents or with noninventive drying methods or noninventive CVD methods cannot achieve such advantageous effects to the extent of the invention, if at all.

The examples which follow serve to further elucidate the invention.

Unless stated otherwise, the (comparative) examples which follow were conducted under air and at ambient pressure (1013 mbar) and room temperature (23° C.). The methods and materials which follow were used.

Carbonization:

Carbonization was effected with a 1200° C. three-zone tubular furnace (TFZ 12/65/550/E301) from Carbolite GmbH using cascade control including a type N sample thermocouple. The stated temperatures are based on the internal temperature of the tubular furnace at the site of the thermocouple. The starting material to be carbonized in each case was weighed into one or more combustion boats made of quartz glass (QCS GmbH) and introduced into a working tube made of quartz glass. The settings and process parameters used for the carbonizations are reported in the respective examples.

CVD Reactor:

The 1000° C. CVD reactor used (HTR 11/150) from Carbolite GmbH consists of a quartz glass drum that lies within an electrically heated rotary kiln with ceramic lining, in which the temperature is controlled. The heating rate along the reaction zone is between 10 and 20 K/min; the heated drum has a homogeneous temperature distribution in the reaction zone. The temperatures stated are based on the target internal temperature of the drum at the site of the thermocouple. The glass drum is thermally insulated from the ambient air with the furnace lid closed. During the process, the glass drum is rotated (315°, oscillation frequency 6-8/min) and has bulges in the wall that ensure additional mixing of the powder. The gas conduit is connected to the quartz glass drum. It is possible there, via a bypass, for the bubbler vessel, the temperature of which is controlled by thermostat, to be switched on for the generation of precursor vapor. By-products formed and purge gases are sucked out into the opposite offgas tube. The settings and process parameters used for the chemical gas phase deposition vary according to the precursor used.

Classification/Sieving:

The C-coated Si powders obtained after the carbonization or chemical gas phase deposition were freed of oversize >20 µm by wet sieving with an AS 200 basic sieving machine (Retsch GmbH) with water on stainless steel sieves. The pulverulent product was dispersed (solids content 20%) in ethanol by means of ultrasound (Hielscher UIS250V; amplitude 80%, cycle: 0.75; duration: 30 min) and applied to the sieve tower with a sieve (20 µm). The sieving was conducted with an infinite time preselection and an amplitude of 50 to 70% with a water stream passing through. The silicon-containing suspension that exited at the bottom was filtered through 200 nm nylon membrane, and the filter residue was dried to constant mass in the vacuum drying cabinet at 100° C. and 50 to 80 mbar.

The following analytical methods and equipment were used to characterize the C-coated Si particles obtained:

Scanning Electron Microscopy (SEM/EDX):

The microscope analyses were conducted with a Zeiss Ultra 55 scanning electron microscope and an energy-dispersive INCA x-sight x-ray spectrometer. Prior to the analysis, the samples were subjected to vapor deposition of carbon with a Baltec SCD500 sputter/carbon coating unit for prevention of charging phenomena.

Transmission Electron Microscopy (TEM):

The analysis of the layer thickness and of the carbon configuration was conducted on a Zeiss Libra 120 transmission electron microscope. The sample was prepared either by embedding into a resin matrix followed by a microtome section or directly from the powder. This was done by dispersing a spatula-tip of each sample in 2 mL of isopropanol by means of ultrasound and applying it to a copper grid. This was dried on both sides on a hot plate at 100° C. for 1 min.

Inorganic Analysis/Elemental Analysis:

The C contents were ascertained with a Leco CS 230 analyzer; for determination of O and N contents, a Leco TCH-600 analyzer was used. The qualitative and quantitative determination of other elements in the carbon-coated silicon particles obtained was conducted by means of ICP (inductively coupled plasma) emission spectroscopy (Optima 7300 DV, from Perkin Elmer). For this purpose, the samples were subjected to acid digestion ($HF/HNO_3$) in a microwave (Microwave 3000, from Anton Paar). The ICP-OES determination is guided by ISO 11885 "Water quality—Determination of selected elements by inductively coupled plasma optical emission spectrometry (ICP-OES) (ISO 11885:2007); German version EN ISO 11885:2009", which is used for analysis of acidic aqueous solutions (for example acidified drinking water, wastewater and other water samples, aqua regia extracts of soils and sediments).

Particle Size Determination:

The particle size distribution was determined to ISO 13320 by means of static laser scattering with a Horiba LA 950. In the preparation of the samples, particular attention must be paid to the dispersing of the particles in the measurement solution in order not to measure the size of agglomerates rather than individual particles. For the C-coated Si particles analyzed here, the particles were dispersed in ethanol. For this purpose, the dispersion, prior to the measurement, if required, was treated with 250 W ultrasound in a Hielscher model UIS250v ultrasound laboratory instrument with LS24d5 sonotrode for 4 minutes.

BET Surface Area Measurement:

The specific surface area of the materials was measured via gas adsorption with nitrogen using a Sorptomatic 199090 instrument (Porotec) or SA-9603MP instrument (Horiba) by the BET method to DIN ISO 9277:2003-05.

Si Accessibility for Fluid Media:

The determination of the accessibility of silicon in the C-coated Si particles for liquid media was conducted by the following test method on materials having known silicon content (from elemental analysis):

0.5 to 0.6 g of C-coated silicon was first dispersed by means of ultrasound with 20 mL of a mixture of NaOH (4 M; $H_2O$) and ethanol (1:1 vol.) and then stirred at 40° C. for 120 min. The particles were filtered through 200 nm nylon membrane, washed to pH neutrality with water and then dried in a drying cabinet at 100° C./50 to 80 mbar. The silicon content after the NaOH treatment was determined and compared with the Si content prior to the test. The liquid-tightness corresponds to the quotient of the Si content of the sample in percent after alkali treatment and the Si content in percent of the untreated C-coated particles.

Determination of Powder Conductivity:

The specific resistance of the C-coated samples was determined in a measurement system from Keithley, 2602 System Source Meter ID 266404, consisting of a pressure chamber (die radius 6 mm) and a hydraulic unit (from Caver, USA, model 3851CE-9; S/N: 130306), under controlled pressure (up to 60 MPa).

Determination of Gas Evolution:

a) By GC Measurement (Headspace):

To determine the evolution of hydrogen of the silicon powders, 50 mg of the sample were weighed into a GC headspace vial (volume 22 mL), and 5 mL of a lithium acetate buffer (pH 7; 0.1 M) were added, and the vial was sealed and heated to 80° C. in an aluminum block while stirring for 30 minutes. The determination of the hydrogen content in the gas phase was conducted by means of GC measurement. Detection was by thermal conductivity detection. The hydrogen content was reported in percent by volume of the gas phase. The gases also detected were oxygen, nitrogen and argon.

b) by measurement of the pressure buildup in a closed system:

To determine the pressure buildup in a closed system, 200 mg of silicon powder were introduced into a tightly sealable glass tube that was designed for pressures of about 10 bar, 20 mL of a lithium acetate buffer (pH 7; 0.1 M) were added and then the system was heated to 80° C. in an aluminum block for 60 minutes and the pressure buildup was read off. The measurement was by means of a digital manometer. The measurements were corrected by the pressure buildup of the buffer used without silicon powder (blank value).

EXAMPLE 1 (EX. 1): UNCOATED MICRO-SI

The silicon powder was produced according to the prior art by grinding coarse Si spall from the production of solar silicon in a fluidized bed jet mill (Netzsch-Condux CGS16 with 90 m³/h of nitrogen at 7 bar as grinding gas).

The particle size was determined in a highly dilute suspension in ethanol.

The SEM image (7500-fold magnification) of the dry Si dust in FIG. 1 shows that the sample consists of individual nonaggregated splintery particles.

Elemental composition: Si≥98% by weight; C 0.10% by weight; H<0.01% by weight; O 0.21% by weight.

Particle size distribution: monomodal; $D_{10}$: 2.77 μm, $D_{50}$: 5.27 μm, $D_{90}$: 8.76 μm; $(D_{90}-D_{10})/D_{50}=1.14$; $(D_{90}-D_{10})=6.0$ μm.

Specific surface area (BET): 2.231 m²/g.
Si imperviosity: 0%.
Powder conductivity: 95.89 μS/cm.
Gas evolution: 4.43% by volume of hydrogen (method a); 3.71 bar (method b).

EXAMPLE 2 (EX. 2)

C-Coated Micro-Si (Dry Method):

238.00 g of the silicon powder from example 1 ($D_{50}$=5.27 μm) and 13.00 g of pitch (Petromasse ZL 250M) were mixed mechanically by means of a ball mill roller bed (Siemens/Groschopp) at 80 rpm for 3 h.

248.00 g of the Si/pitch mixture were introduced into a quartz glass boat (QCS GmbH) and carbonized in a three-zone tubular furnace (TFZ 12/65/550/E301; Carbolite GmbH) using cascade control including a type N sample thermocouple with nitrogen/$H_2$ as inert gas:

first heating rate 10° C./min, temperature 350° C., hold time 30 min (pitch was fully melted), $N_2/H_2$ flow rate 200 mL/min; then directly further at heating rate 3° C./min, temperature 550° C.; then directly further at heating rate 10° C./min, temperature 1000° C., then hold time 2 h, $N_2/H_2$ flow rate 200 mL/min.

After cooling, 242.00 g of a black powder were obtained (carbonization yield 98%), which was freed of oversize by means of wet sieving. 239.00 g of C-coated Si particles with a particle size of $D_{99}$<20 μm were obtained.

Figure 2:
FIG. 2 is an SEM image (7,500-fold magnification) of the carbon-coated Si particles obtained in Example 2.
Figure 3:
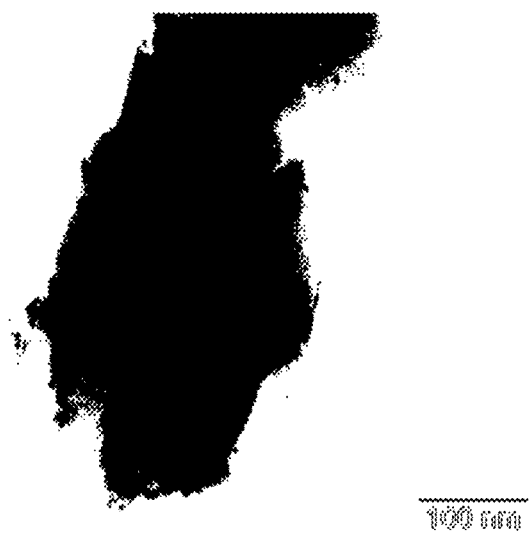
FIG. 3 is a TEM image (40,000-fold magnification) of the carbon-coated Si particles obtained in Example 2.

FIG. 2 shows an SEM image (7500-fold magnification) and FIG. 3 a TEM image (40 000-fold magnification) of the C-coated Si particles obtained.

Elemental composition: Si 94% by weight; C 2.88% by weight; H 0.01% by weight; O 0.44% by weight; N 0% by weight.

Particle size distribution: monomodal; $D_{10}$: 3.46 μm, $D_{50}$: 5.52 μm, $D_{90}$: 8.59 μm; $(D_{90}-D_{10})/D_{50}=0.93$.

Specific surface area (BET): 1.20 m²/g.
Si imperviosity: ~100%.
Powder conductivity: 20003.08 μS/cm.
Gas evolution: no $H_2$ evolution (method a); no pressure buildup (method b).

EXAMPLE 3 (EX. 3): UNCOATED MICRO-SI

The silicon powder was produced according to the prior art by grinding coarse Si spall from the production of solar silicon in a fluidized bed jet mill (Netzsch-Condux CGS16 with 90 m³/h of nitrogen at 7 bar as grinding gas).

The particle size was determined in a highly dilute suspension in ethanol.

Elemental composition: Si 99% by weight; C<0.1% by weight; O 0.34% by weight; N<0.1% by weight.

Particle size distribution: monomodal; $D_{10}$: 2.23 μm, $D_{50}$: 4.45 μm, $D_{90}$: 7.78 μm; $(D_{90}-D_{10})/D_{50}=1.25$; $(D_{90}-D_{10})=5.5$ μm.

Specific surface area (BET): 2.4 m²/g.
Si imperviosity: 0%.
Powder conductivity: 94.39 μS/cm.

EXAMPLE 4 (EX. 4)

C-Coated Micro-Si (Dry Method):

270.00 g of the silicon powder from example 3 ($D_{50}$: =4.45 μm) and 30.00 g of polyacrylonitrile (PAN) were mixed mechanically by means of a ball mill roller bed (Siemens/Groschopp) at 80 rpm for 3 h.

298.00 g of the Si/PAN mixture were introduced into a quartz glass boat (QCS GmbH) and carbonized in a three-zone tubular furnace (TFZ 12/65/550/E301; Carbolite GmbH) using cascade control including a type N sample thermocouple with nitrogen/$H_2$ as inert gas:

first heating rate 10° C./min, temperature 300° C., hold time 90 min (pitch was fully melted), $N_2/H_2$ flow rate 200 mL/min; then directly further at heating rate 10° C./min, temperature 1000° C., hold time 3 h, $N_2/H_2$ flow rate 200 mL/min.

After cooling, 280.00 g of a black powder were obtained (carbonization yield 94%), which was freed of oversize by means of wet sieving. 267.00 g of C-coated Si particles having a particle size of D99<20 μm were obtained.

Figure 4:
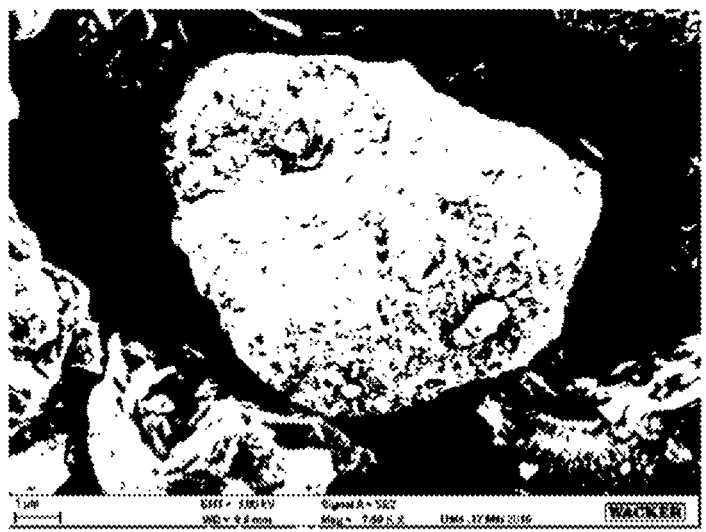
FIG. 4 is an SEM image (7,500-fold magnification) of the carbon-coated Si particles obtained in Example 4.
Figure 5:
FIG. 5 is a TEM image (40,000-fold magnification) of the carbon-coated Si particles obtained in Example 4.

FIG. 4 shows an SEM image (7500-fold magnification) and FIG. 5 a TEM image (40 000-fold magnification) of the C-coated Si particles obtained.

Elemental composition: Si≥94% by weight; C 5.01% by weight; O 0.61% by weight; N 0.3% by weight.

Particle size distribution: monomodal; $D_{10}$: 2.35 μm, $D_{50}$: 4.51 μm, $D_{90}$: 8.01 μm; $(D_{90}-D_{10})/D_{50}=1.26$.

Specific surface area (BET): 1.3 m²/g.
Si imperviosity: ~100%.
Powder conductivity: 50678.78 μS/cm.
Gas evolution: no $H_2$ evolution (method a); no pressure buildup (method b).

EXAMPLE 5 (EX. 5)

Inventive Anode with C-Coated Micro-Si from Example 4:

29.71 g of polyacrylic acid (dried at 85° C. to constant weight; Sigma-Aldrich, $M_w$~450 000 g/mol) and 756.60 g of deionized water were agitated by means of a shaker (290 l/min) for 2.5 h until dissolution of the polyacrylic acid was complete. Lithium hydroxide monohydrate (Sigma-Aldrich) was added in portions to the solution until the pH was 7.0 (measured by WTW pH 340i pH meter and SenTix RJD probe). The solution was subsequently mixed by means of a shaker for a further 4 h. 7.00 g of the nonaggregated carbon-coated silicon particles from example 2 were then dispersed in 12.50 g of the neutralized polyacrylic acid solution and 5.10 g of deionized water by means of a dissolver at a circumferential speed of 4.5 m/s for 5 min and of 12 m/s for 30 min while cooling at 20° C. After adding 2.50 g of graphite (Imerys, KS6L C), the mixture was stirred at a circumferential speed of 12 m/s for a further 30 min. After degassing, the dispersion was applied by means of a film applicator with gap height 0.20 mm (Erichsen, model 360) to a copper foil having a thickness of 0.03 mm (Schlenk Metallfolien, SE-Cu58). The anode coating thus obtained was then dried at 50° C. and air pressure 1 bar for 60 min.

The average basis weight of the dry anode coating was 2.90 mg/cm² and the coating density 0.8 g/cm³.

EXAMPLE 6 (EX. 6)

Inventive Lithium Ion Battery Having the Anode from Example 5:

The electrochemical studies were conducted in a button cell (CR2032 type, Hohsen Corp.) in a 2-electrode arrangement. The electrode coating from example 5 was used as counterelectrode or negative electrode ($D_m$=15 mm); a coating based on lithium-nickel-manganese-cobalt oxide 6:2:2 with a content of 94.0% and average basis weight of 14.8 mg/cm$^2$ (sourced from Custom Cells) was used as working electrode or positive electrode ($D_m$=15 mm). A glass fiber filter paper (Whatman, GD Type D) soaked with 120 µL of electrolyte served as separator ($D_m$=16 mm). The electrolyte used consisted of a 1.0 molar solution of lithium hexafluorophosphate in a 3:7 (v/v) mixture of fluoroethylene carbonate and ethyl methyl carbonate, to which 2.0% by weight of vinylene carbonate had been added. The cell was constructed in a glovebox (<1 ppm H$_2$O, O$_2$); the water content in the dry matter of all components used was below 20 ppm.

The electrochemical testing was conducted at 20° C. The cells were charged by the cc/cv method (constant current/constant voltage) with a constant current of 5 mA/g (corresponding to C/25) in the first cycle and of 60 mA/g (corresponding to C/2) in the subsequent cycles and, on attainment of the voltage limit of 4.2 V, at constant voltage until the current went below 1.2 mA/g (corresponding to C/100) or 15 mA/g (corresponding to C/8). The cell was discharged by the cc method (constant current) with a constant current of 5 mA/g (corresponding to C/25) in the first cycle and of 60 mA/g (corresponding to C/2) in the subsequent cycles until attainment of the voltage limit of 3.0 V. The specific current chosen was based on the weight of the coating of the positive electrode.

On the basis of the formulation in examples 5 and 6, the lithium ion battery was operated by cell balancing with partial lithiation of the anode.

The full cell in the second cycle had a reversible initial capacity of 2.03 mAh/cm$^2$ and after 220 charge/discharge cycles still had 80% of its original capacity.

COMPARATIVE EXAMPLE 7 (CEx. 7)

Noninventive Anode with the Uncoated Micro-Si from Example 3:

The silicon particles from example 3 were used as described in example 5 to produce an anode.

The average basis weight of the anode coating thus prepared was 2.94 mg/cm$^2$ and the coating density 0.9 g/cm$^3$.

COMPARATIVE EXAMPLE 8 (CEx. 8)

Noninventive Lithium Ion Battery with the Anode from Comparative Example 7:

The anode from comparative example 7 comprising uncoated silicon particles was tested as described in example 6.

On the basis of the formulation in comparative examples 7 and 8, the lithium ion battery was operated by cell balancing with partial lithiation of the anode.

The full cell in the second cycle had a reversible initial capacity of 2.03 mAh/cm$^2$ and after 203 charge/discharge cycles had only 80% of its original capacity.

EXAMPLE 9 (EX. 9): C-COATED MICRO-SI (CVD METHOD)

20.00 g of the silicon powder from example 1 ($D_{50}$=5.27 µm) were transferred at room temperature into the glass tube of the CVD reactor (HTR 11/150) from Carbolite GmbH. The introducing of the sample was followed by a purge procedure with the process gases (10 min argon 3 slm; 3 min ethene and H$_2$ each 1 slm, 5 min argon 3 slm). With a heating rate of 20 K/min, the reaction zone was heated to 900° C. Even during the purging and heating, the tube was rotated (315° with an oscillation frequency of 8/min) and the powder was mixed. On attainment of the target temperature, there followed a hold time of 10 min. The CVD coating was conducted for a reaction time of 30 min with a total gas flow rate of 3.6 slm with the following gas composition:

2 mol of ethene, 0.3 slm, 8.33% by volume; argon 2.4 slm, 66.67% by volume; He 0.9 slm, 26% by volume.

After cooling, 15.00 g of a black powder were obtained (yield 75%), which was freed of oversize by means of wet sieving.

14.50 g of C-coated Si particles having a particle size of D99<20 µm were obtained.

Figure 6:
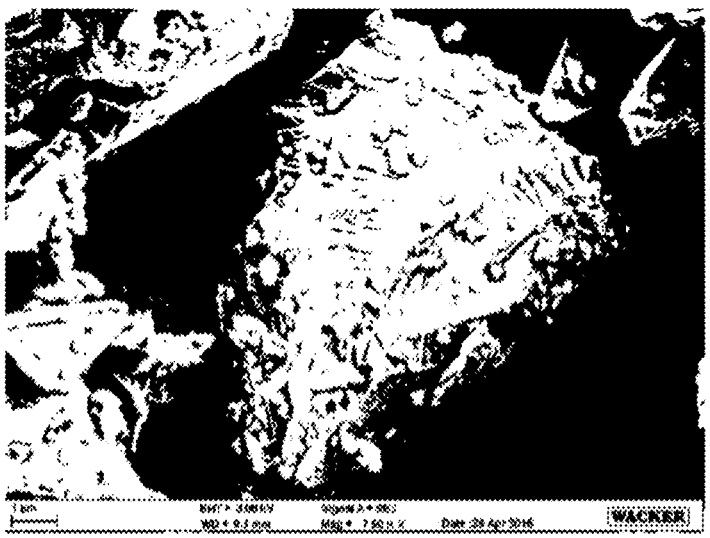
FIG. 6 is an SEM image (7,500-fold magnification) of the carbon-coated Si particles obtained in Example 9.
Figure 7:
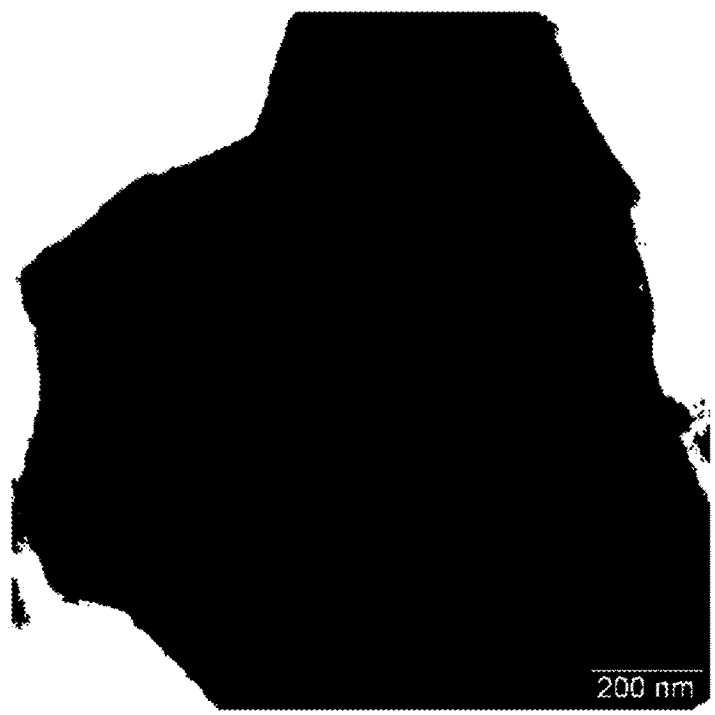
FIG. 7 is a TEM image (20,000-fold magnification) of the carbon-coated Si particles obtained in Example 9.

FIG. 6 shows an SEM image (7500-fold magnification) and FIG. 7 a TEM image (20 000-fold magnification) of the C-coated Si particles obtained.

Elemental composition: Si≥94% by weight; C 2.54% by weight; H<0.01% by weight; O 0.10% by weight; N<0.01% by weight.

Particle size distribution: monomodal; $D_{10}$: 2.79 µm, $D_{50}$: 5.26 µm, $D_{90}$: 8.77 µm; $(D_{90}-D_{10})/D_{50}$=1.44.

Specific surface area (BET): 2.10 m$^2$/g.

Si imperviosity: ~100%.

Powder conductivity: 818267.37 µS/cm.

Gas evolution: no H$_2$ evolution (method a); no pressure buildup (method b).

COMPARATIVE EXAMPLE 10 (CEx. 10)

Aggregated C-coated micro-Si (pitch-based from toluene): 3.00 g of pitch (Petromasse ZL 250M) were dissolved in 100 mL of toluene at room temperature and stirred for 24 h. 70.00 g of the silicon powder from example 1 ($D_{50}$=5.27 µm) were dispersed into the pitch solution by means of ultrasound (Hielscher UIS250V; amplitude 80%, cycle: 0.9; duration: 60 min). After the solvent had been removed under reduced pressure, 70.00 g of a black powder were obtained.

69.00 g of the Si/pitch powder were introduced into a quartz glass boat (QCS GmbH) and carbonized in a three-zone tubular furnace (TFZ 12/65/550/E301; Carbolite GmbH) using cascade control including a type N sample thermocouple with nitrogen/H$_2$ as inert gas:

first heating rate 10° C./min, temperature 350° C., hold time 30 min, N$_2$/H$_2$ flow rate 200 mL/min; then directly further at heating rate 3° C./min, temperature 550° C.; then directly further at heating rate 10° C./min, temperature 1000° C., then hold time 2 h, N$_2$/H$_2$ flow rate 200 mL/min.

After cooling, 68.00 g of a black powder were obtained (carbonization yield 98%), which was freed of oversize by means of wet sieving. 5.00 g of C-coated Si particles having a particle size of $D_{99}$<20 µm were obtained.

Figure 8:
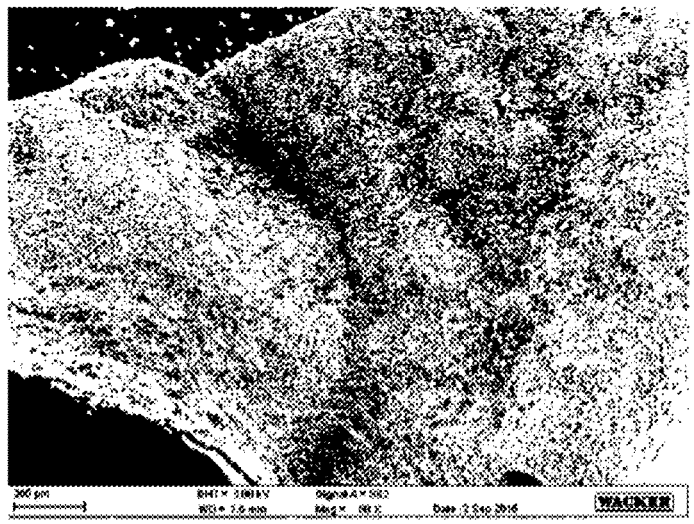
FIG. 8 is an SEM image (7,500-fold magnification) of the carbon-coated Si particles obtained in Comparative example 10.

FIG. 8 shows an SEM image (7500-fold magnification) of the C-coated Si particles obtained.

Elemental composition: Si≥93% by weight; C 2.05% by weight; H 0.02% by weight O 0.46% by weight; N<0.01% by weight.

Particle size distribution: monomodal; $D_{10}$: 3.61 µm, $D_{50}$: 5.88 µm, $D_{90}$: 9.29 µm; $(D_{90}-D_{10})/D_{50}$=0.97.

Specific surface area (BET): 1.33 m$^2$/g.

Si imperviosity: <1%.

Powder conductivity: 3413.97 µS/cm.

COMPARATIVE EXAMPLE 11 (CEx. 11)

Aggregated C-Coated Micro-Si (PAN-Based from DMF):

5.00 g of polyacrylonitrile (PAN) were dissolved in 333 mL of dimethylformamide (DMF) at room temperature. 8.00 g of the silicon powder from example 3 ($D_{50}$=4.45 μm) were dispersed into the PAN solution by means of ultrasound (Hielscher UIS250V; amplitude 80%, cycle: 0.9; duration: 30 min). The resulting dispersion was sprayed and dried with a laboratory spray drier of the B-290 type (BÜCHI GmbH) with B-295 inert loop and B-296 dehumidifier (BÜCHI GmbH) (nozzle tip 0.7 mm; nozzle cap 1.4 mm; nozzle temperature 130° C.; $N_2$ gas flow rate 30; aspirator 100%; pump 20%). 7.57 g of a brown powder were obtained (58% yield).

6.86 g of the Si/PAN powder were introduced into a quartz glass boat (QCS GmbH) and carbonized in a three-zone tubular furnace (TFZ 12/65/550/E301; Carbolite GmbH) using cascade regulation including a type N sample thermocouple with nitrogen/$H_2$ as inert gas:

first heating rate 10° C./min, temperature 300° C., hold time 90 min, $N_2/H_2$ flow rate 200 mL/min; then directly further at heating rate 10° C./min, temperature 1000° C., hold time 3 h, $N_2/H_2$ flow rate 200 mL/min.

After cooling, 4.86 g of a black powder were obtained (carbonization yield 71%), which was freed of oversize by means of wet sieving. 4.10 g of C-coated Si particles having a particle size of D99<20 μm were obtained.

Figure 9:
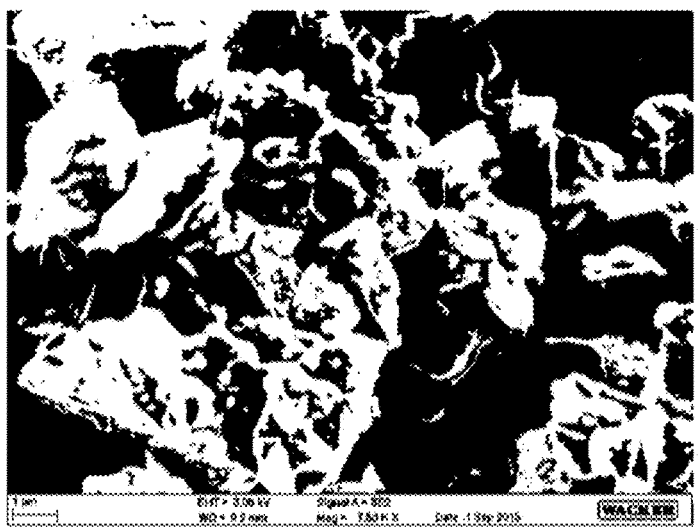
FIG. 9 is an SEM image (7,500-fold magnification) of the carbon-coated Si particles obtained in Comparative example 11.

FIG. 9 shows an SEM image (7500-fold magnification) of the C-coated Si particles obtained.

Elemental composition: Si≥75% by weight; C 19.9% by weight; O 3.08% by weight; N 0.97% by weight.

Particle size distribution: monomodal; $D_{10}$: 5.69 μm, $D_{50}$: 8.98 μm, $D_{90}$: 14.2 μm; $(D_{90}-D_{10})/D_{50}$=0.95.

Specific surface area (BET): 10.3 m²/g.

Si imperviosity: ~100%.

Powder conductivity: 66714.85 μS/cm.

COMPARATIVE EXAMPLE 12 (CEx. 12)

Noninventive Anode with the Aggregated C-Coated Micro-Si from Comparative Example 11:

The aggregated carbon-coated silicon microparticles from comparative example 11 were used as described in example 5 to produce an anode.

The average basis weight of the anode coating thus produced was 3.0 mg/cm² and the coating density 0.6 g/cm³.

COMPARATIVE EXAMPLE 13 (CEx. 13)

Noninventive Lithium Ion Battery with the Anode from Comparative Example 12:

The anode with the aggregated carbon-coated silicon microparticles from comparative example 12 was tested as described in example 6.

On the basis of the formulation in comparative examples 12 and 13, the lithium ion battery was operated by cell balancing with partial lithiation of the anode.

The full cell in the second cycle had a reversible initial capacity of only 1.85 mAh/cm² and after 221 charge/discharge cycles still had 80% of its original capacity.

COMPARATIVE EXAMPLE 14 (CEx. 14)

Densification of the Anode from Comparative Example 12 Comprising Aggregated C-Coated Micro-Si:

The anode with the aggregated carbon-coated silicon microparticles from comparative example 12 was densified in a compression die by means of a uniaxial laboratory press (L.O.T.).

The average basis weight of the anode coating thus produced was 3.0 mg/cm² and the coating density 0.9 g/cm³.

COMPARATIVE EXAMPLE 15 (CEx. 15)

Noninventive Lithium Ion Battery with the Anode from Comparative Example 14:

The densified anode from comparative example 14 comprising aggregated carbon-coated silicon microparticles was tested as described in example 6.

On the basis of the formulation in comparative examples 14 and 15, the lithium ion battery was operated by cell balancing with partial lithiation of the anode.

The full cell in the second cycle had a reversible initial capacity of 2.00 mAh/cm² and after 60 charge/discharge cycles had only 80% of its original capacity.

Table 1 summarizes the testing results of example 6 and comparative examples 8, 13 and 15.

The lithium ion battery of example 6 surprisingly showed, by comparison with the lithium ion batteries of comparative examples 8, 13 and 15, both a high initial capacity and more stable electrochemical characteristics.

TABLE 1

Testing results of (comparative) examples 6, 8, 13 and 15:

| (C) Ex. | Silicon particles C* | Agg.** | Coating density [g/cm³] | Discharge capacity after cycle 1 [mAh/cm²] | Number of cycles with ≥80% retention of capacity |
|---|---|---|---|---|---|
| 6 | yes | no | 0.8 | 2.03 | 220 |
| 8 | no | no | 0.9 | 2.03 | 203 |
| 13 | yes | yes | 0.6 | 1.85 | 221 |
| 15 | yes | yes | 0.9 | 2.00 | 60 |

*silicon particles with carbon coating;
**aggregated particles.

The invention claimed is:

1. Nonaggregated carbon-coated silicon particles for lithium batteries, comprising:
   the nonaggregated carbon-coated silicon particles having average particle diameters $d_{50}$ of 1 to 15 μm, containing ≤10% by weight of carbon and ≥90% by weight of silicon, based in each case on the total weight of the carbon-coated silicon particles, wherein the nonaggregated carbon-coated silicon particles have a degree of aggregation of ≤40%,
   wherein the degree of aggregation is the percentage of particles, after ultrasonic dispersion in ethanol, which are retained on a sieve having a mesh size of twice a volume-weighted $D_{90}$ value of the particles.

2. The nonaggregated carbon-coated silicon particles as claimed in claim 1, wherein the nonaggregated carbon-coated silicon particles have a degree of aggregation of ≤30% (determined by means of sieve analysis).

3. The nonaggregated carbon-coated silicon particles as claimed in claim 1, wherein the carbon coating of the nonaggregated carbon-coated silicon particles has an average layer thickness in the range from 1 to 100 nm as determined by: scanning electron microscopy (SEM).

4. A method for producing carbon-coated silicon particles for lithium ion batteries, comprising:
   a) drying mixtures comprising silicon particles and one or more meltable carbon precursors by heating the mixtures to a temperature of <400° C. until the meltable carbon precursors have completely melted, and then the molten carbon precursors thus obtained are carbonized; or
   b) coating the silicon particles with carbon by chemical vapor deposition from one or more carbon precursors, wherein the silicon particles are agitated during the chemical vapor deposition, and the chemical vapor deposition is conducted in an atmosphere containing carbon precursors to an extent of 0.1% to 80% by volume, based on the total volume of the atmosphere.

5. The method for producing the carbon-coated silicon particles as claimed in claim 4, wherein the silicon particles used as reactant for production of nonaggregated carbon-coated silicon particles have a volume-weighted particle size distribution having diameter percentiles $d_{50}$ of 1 to less than 15 µm.

6. The method for producing the carbon-coated silicon particles as claimed in claim 5, wherein the difference between the volume-weighted particle size distribution $d_{50}$ of the nonaggregated carbon-coated silicon particles and the volume-weighted particle size distribution $d_{50}$ of the silicon particles used as reactant for production of the nonaggregated carbon-coated silicon particles is ≤5 µm.

7. The method for producing the carbon-coated silicon particles as claimed in claim 4, wherein one or more carbon precursors are selected from the group consisting of methane, ethane, propane, butane, pentane, isobutane, hexane, ethylene, propylene, butene, acetylene, benzene, toluene, styrene, ethylbenzene, diphenylmethane, naphthalene, phenol, cresol, nitrobenzene, chlorobenzene, pyridine, anthracene and phenanthrene.

8. The method for producing the carbon-coated silicon particles as claimed in claim 4, wherein the chemical vapor deposition is conducted in an atmosphere containing carbon precursors to an extent of 1% to 30% by volume, based on the total volume of the atmosphere.

9. The method for producing the carbon-coated silicon particles as claimed in claim 4, wherein one or more meltable carbon precursors are selected from the group consisting of polyacrylonitrile, mono-, di- and polysaccharides, polyaniline, polystyrene, pitches and tars.

10. An anode materials for lithium ion batteries comprising:
   one or more binders,
   optionally graphite,
   optionally one or more further electrically conductive components and optionally one or more additives, wherein one or more carbon-coated silicon particles as claimed in claim 1 are present.

11. Lithium ion batteries comprising:
   a cathode,
   an anode,
   a separator and an electrolyte, wherein the anode is based on an anode material as claimed in claim 10.

12. Lithium ion batteries as claimed in claim 11, wherein the anode material of a fully charged lithium ion battery has only been partly lithiated.

13. Lithium ion batteries as claimed in claim 12, wherein the ratio of lithium atoms to silicon atoms in the partly lithiated anode material of the fully charged battery is ≤2.2.

14. Lithium ion batteries as claimed in claim 12, wherein the capacity of the silicon in the anode material of the lithium ion battery is utilized to an extent of ≤50%, based on the maximum capacity of 4200 mAh per gram of silicon.

* * * * *